UNITED STATES PATENT OFFICE.

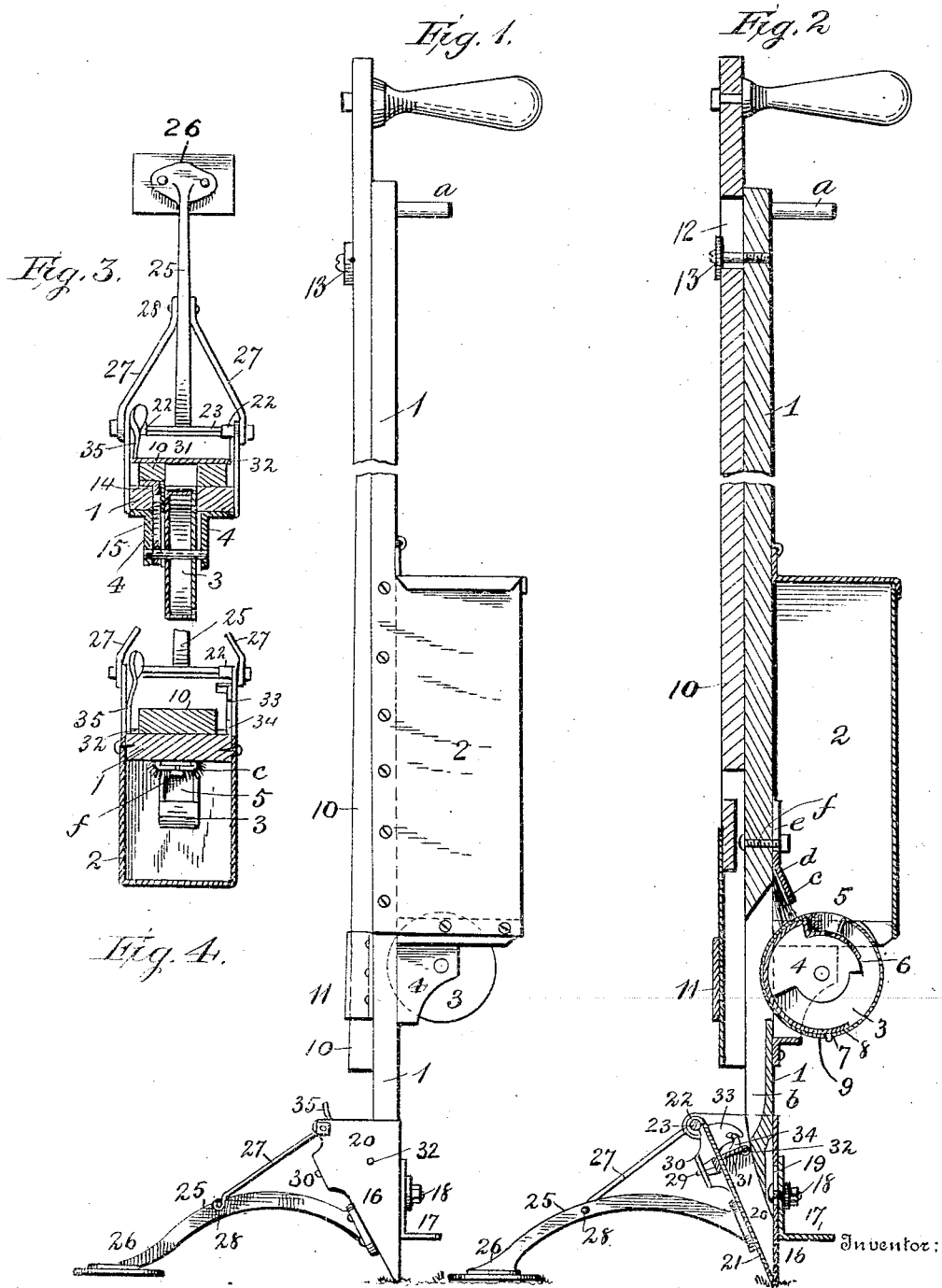

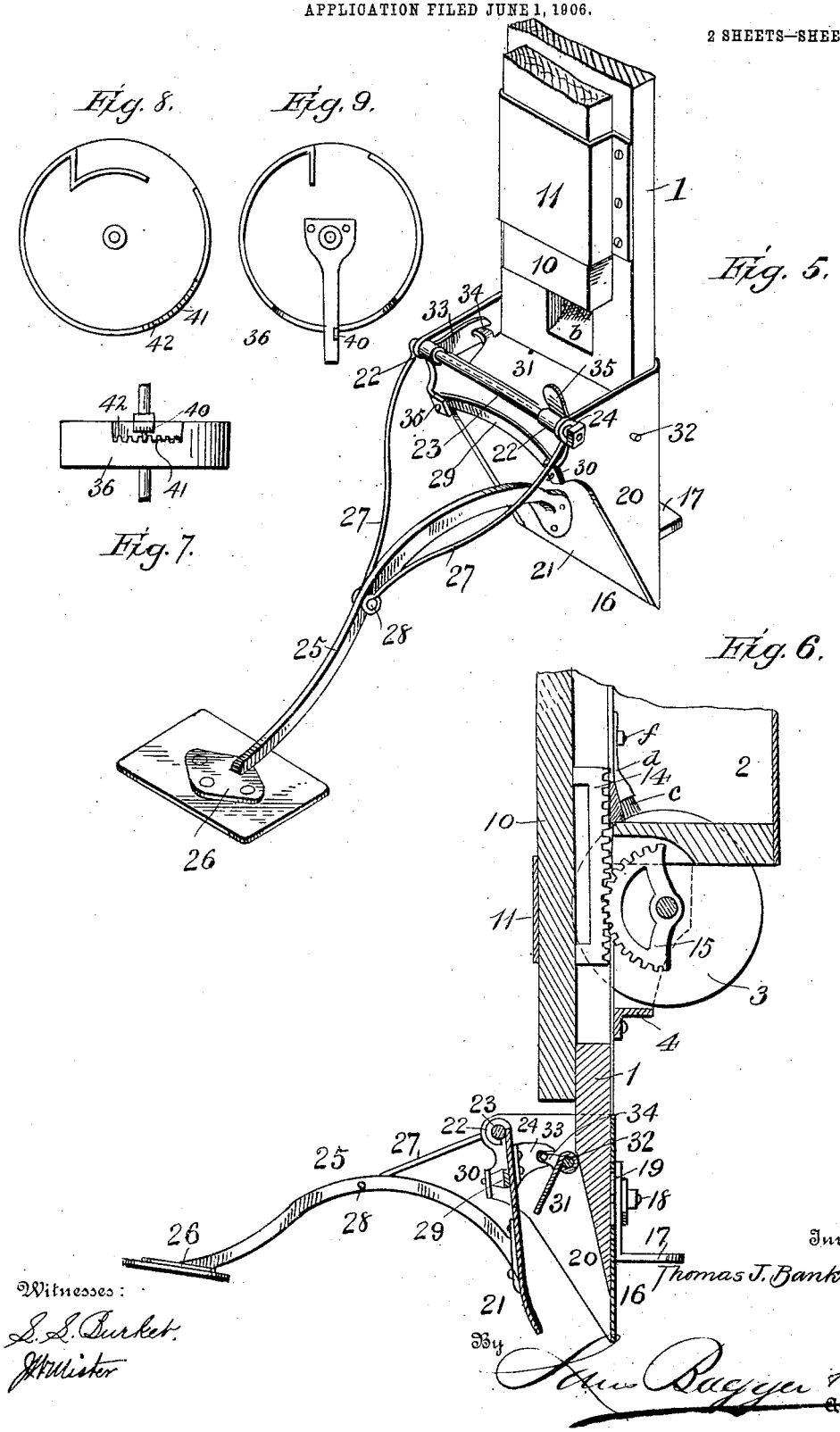

THOMAS J. BANKS, OF GREENVILLE, MICHIGAN.

HAND SEED-PLANTER.

No. 835,743.      Specification of Letters Patent.      Patented Nov. 13, 1906.

Application filed June 1, 1906. Serial No. 319,780.

*To all whom it may concern:*

Be it known that I, THOMAS J. BANKS, a citizen of the United States, residing at Greenville, in the county of Montcalm and State of Michigan, have invented certain new and useful Improvements in Hand Seed-Planters, of which the following is a specification.

My invention pertains to improvements in what may be termed "hand-actuated seed-drills." Its object is to provide for readily and effectively performing the drilling operation, as in sowing or dropping the seed, to effect the ready adjustment of the seed-dropping mechanism to regulate or control the quantity of seed dropped at each actuation of such mechanism, and carry out these ends in a simple, economic, and effective manner.

Said invention consists of certain features, substantially as hereinafter fully disclosed, and specifically pointed out by the claims.

In the accompanying drawings, illustrating the preferred embodiment of my invention, Figure 1 is a side elevation thereof. Fig. 2 is a vertical section of the same. Fig. 3 is a horizontal section produced about in the line of the axis of the dropper proper. Fig. 4 is a horizontal section taken through the seed receptacle or hopper above the dropper proper viewing from above, the latter having its seed receiving or containing cavity or cell positioned as when being filled. Fig. 5 is a broken detached perspective view more especially of the foot-actuated seed-releasing device. Fig. 6 is a vertical section produced through the same device, the valve being retained in open position by the action of a cam-lever. Figs. 7, 8, and 9 are detail views of a modification of the seed-cell-adjusting mechanism.

In carrying out my invention I suitably secure in position upon a convenient form of support or standard 1 a receptacle or hopper 2 for holding or carrying the seed for dropping or drilling into the ground previously prepared for that purpose. Said supporting-standard has projecting from its rear, at its upper end, a fixed peg or finger-piece $a$ for readily lifting or carrying the device when not in actual use.

A dropping wheel or drum or the dropper proper, 3, is hung or journaled in a suitable casting or bracket 4, fastened to said standard, so that a segment of said wheel or drum may extend upward through the bottom of the hopper 2, with its seed-containing cavity or cell 5 opening into said hopper for the reception of the seed therein. Said wheel or dropper has also a segment or portion of its surface standing in the plane of the supporting standard or member 1, and the latter has in its front side a longitudinal groove or channel $b$, extending toward its lower end for receiving the seed dropped or dumped from said wheel and delivering the same below. Said drum or wheel has arranged or housed therein a movable or adjustable section or member 6, bent or adapted to extend inward near one end to form one end wall of the cavity or cell 5 and still further extended after being thus bent to form the bottom of said cavity, with said bottom-forming portion assuming the outline of an arc and adapted to extend or slide under the bottom edge of the opposite end wall of said cavity. Said section or member extends in the opposite direction for a portion of its length under the rim of said drum or wheel and has a spring clasp or detent 7 extending out through an elongated slot 8, formed in said wheel-rim, and has engagement with any one of a number of notches 9 in one of its longitudinal edges, whereby by suitably actuating said clasp or detent it may be adjusted to requisitely move and retain said section or member as desired for the purpose aforesaid.

Arranged within the receptacle 2, so as to suitably engage the periphery of the wheel or drum 3 for removing surplus seed from its cavity or cell, is a brush or scraper $c$, having its carrying or suspending portion or member $d$ longitudinally slotted, as at $e$, and adjustable in position thereby and by a set or holding screw $f$, passing through the slot $e$ and entering the support or standard 1 for compensating wear of the brush in its more or less frictional contact with the dropping-wheel.

A movable handled bar 10 is arranged parallel with and alongside of the standard or support 1, it passing through a keeper 11 near its lower end, fastened to said support and having an elongated vertical slot 12 receiving a headed and washer-equipped bolt or stud 13, projecting from said support near its opposite end for its guidance and retention in position, so as to be readily moved when suitably actuated. The handled bar or part 10 is provided with a toothed rack 14, adapted to engage and actuate a corresponding toothed sector 15, fixed to the axis of the drum or wheel 3 for suitably operating the latter by actuating said handled bar, the movement of the same being controlled by the slot-and-bolt connection above noted.

A shoe or what may be otherwise termed a "chute" 16 is secured to the rear surface of the standard or support 1 at its lower end and into which chute or shoe the channel or groove in said standard delivers the seed dropped or discharged thereinto by the dropping-wheel 3 for the final delivery of the seed to the ground into hills. Said chute or shoe having its extreme lower edge suitably beveled or tapered to enable it to readily enter the ground, has adjustably applied or connected to its rear surface to regulate its depth of penetration a gage or stop 17, such connection being effected by a nut-equipped bolt 18, projecting from said surface of the chute or shoe and passing through a vertical slot 19 in said gage. Hung or pivoted in the otherwise open side of said shoe or chute between the downwardly tapered or inclined lateral flanges 20 of said chute is a spring-pressed plate or valve 21 for the proper delivery of the seed received thereinto as aforesaid and as will be presently clearly explained. The hinged or pivotal connection between said valve or plate and said chute or shoe is effected, preferably, by curving lug extensions 22, formed with the top edge of said plate or valve, over a pivot bolt or rod 23, passing through opposed apertures 24, produced in the lateral flanges 20 of said chute or shoe through its upper forward corner edges. A pedal-like lever 25, preferably having a somewhat-recurved outline and a plate 26, suitably secured to its outer end, is fixed about centrally to the forward surface of the plate or valve 21 for its suitable and convenient actuation by the application of the foot to the under side of the outer plate-equipped end of said lever. Said lever is suitably braced in position by lateral diagonal rods or braces 27, suitably connected laterally, preferably to a common cross pin or bolt 28, passing through said lever, and to the pivot bolt or rod 23, as shown. The spring-pressure exerted upon the plate or valve 21 to hold it normally closed is effected by means of a practically semi-elliptic plate-spring 29, adapted to deliver its action upon said plate and having its ends received in apertured inwardly-projecting lugs 30 upon forward edges of the lateral flanges 20.

A second valve member 31 in the form of a narrow plate has suitable pivotal connection with the upper portions of the flanges 20, preferably by means of the laterally-extending ends of a pivot-rod 32, entering apertures in said flanges, said plate or valve member being held normally in engagement at its free longitudinal edge with the plate or valve 21 by a jointed connection therebetween, the two plates or valves conjointly thus forming a supplemental bottom within the chute or shoe for the preliminary reception of the seed as the latter is dropped into said chute or shoe, as above noted. Said jointed connection comprises two lugs 33 34, fixed to said plates or valves 21 31, respectively, at suitable points thereon and loosely connected together and working one into the other for the purpose aforesaid under the action of the common spring 29.

A manually-actuated lever 35, preferably right-angled in outline and suitably fulcrumed upon the pivot-rod 32 and having one arm extending under the valve member 31, has its other arm standing outward, so as to permit its being conveniently grasped, and by suitably actuating which said valve member may be moved, together with the valve 21. into open position and be thus temporarily held when required, the outward-standing arm or handle of said lever being itself retained in position by resting against the standard 1.

In the modification as suggested by Fig. 7 is a dropping wheel or drum 36, with an arcuate spring section or member arranged to move between outer and inner circumferential walls of the drum, and which section or member, as in the form aforesaid, is adapted to form a variable cavity or cell for the drum or wheel, also has a detent or stud 40, spring-pressed normally into engagement with any required notch of the series 41, indenting a longitudinal edge of a slot 42, arranged about in the center of the periphery of said drum.

I claim—

1. A device of the character described, employing a chute applied to the bottom end of a seed-carrying receptacle and comprising a fixed member and a pivoted member hung at its upper edge between lateral portions of said fixed member at its corresponding upper edge, and spring-retained in engagement with said fixed member and a pedal-like lever fixed to said pivoted member and extending some distance therefrom, and having fixed to its distant end a horizontal plate effective for engagement with the surface or ground to aid the actuation of said pivoted member.

2. A device of the character described, employing a chute applied to a seed-carrying receptacle and comprising a fixed member and a pivoted member hung at its upper edge between lateral portions of said fixed member at corresponding upper edges thereof, means for actuating said pivoted member, a spring-pressed valve-plate loosely connected or jointed to said pivoted member, with its bottom edge effective for engagement with said pivoted chute member to form a supplemental bottom to said chute.

3. A device of the character described, employing a chute applied to the seed-receptacle-carrying member comprising a fixed member and a pivoted member hung between lateral portions of said fixed member, a spring-pressed valve member adapted to form a supplemental bottom in said chute, and loosely connected or jointed to said pivoted member, and a manually-actuated angular lever having one arm arranged under one of said chute members and the other arm adapted to serve as a handle therefor.

In testimony whereof I have signed my name to this specification in the presence of two subscribing witnesses.

THOMAS J. BANKS.

Witnesses:
S. A. BOOTH,
CARRIE BOOTH.